(12) United States Patent
Subramanian et al.

(10) Patent No.: US 12,463,269 B2
(45) Date of Patent: Nov. 4, 2025

(54) BATTERY ARRAY FRAMES WITH SPLIT THERMAL FIN DESIGNS FOR REDUCING THERMAL INTERFACE MATERIAL USAGE

(71) Applicant: FORD GLOBAL TECHNOLOGIES, LLC, Dearborn, MI (US)

(72) Inventors: Rajaram Subramanian, Ann Arbor, MI (US); Dave Moschet, Dearborn, MI (US); James Maurice Boileau, Novi, MI (US); Shamsuddin A. Syed, Canton, MI (US); Suriyaprakash Ayyangar Janarthanam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 284 days.

(21) Appl. No.: 18/166,136

(22) Filed: Feb. 8, 2023

(65) Prior Publication Data
US 2023/0187726 A1   Jun. 15, 2023

Related U.S. Application Data

(62) Division of application No. 17/010,135, filed on Sep. 2, 2020, now Pat. No. 11,581,595.

(51) Int. Cl.
| | |
|---|---|
| *H01M 10/6551* | (2014.01) |
| *H01M 10/625* | (2014.01) |
| *H01M 10/647* | (2014.01) |
| *H01M 10/6554* | (2014.01) |
| *H01M 10/6555* | (2014.01) |
| *H01M 50/249* | (2021.01) |

(52) U.S. Cl.
CPC ..... *H01M 10/6551* (2015.04); *H01M 10/625* (2015.04); *H01M 10/647* (2015.04); *H01M 10/6554* (2015.04); *H01M 10/6555* (2015.04); *H01M 50/249* (2021.01); *H01M 2220/20* (2013.01)

(58) Field of Classification Search
CPC .......... H01M 10/6551; H01M 10/625; H01M 10/647; H01M 10/6554; H01M 10/6555; H01M 10/613; H01M 10/6556; H01M 10/6567; H01M 50/249; H01M 50/211; H01M 50/244; H01M 2220/20
See application file for complete search history.

(56) References Cited

U.S. PATENT DOCUMENTS

| | | | |
|---|---|---|---|
| 10,396,413 | B2 | 8/2019 | Garfinkel et al. |
| 2010/0266883 | A1 | 10/2010 | Koetting et al. |
| 2013/0280565 | A1 | 10/2013 | Lee et al. |
| 2016/0079640 | A1 | 3/2016 | Kim |
| 2016/0133997 | A1* | 5/2016 | Vejalla ............... H01M 10/6551 429/120 |

(Continued)

*Primary Examiner* — Eugenia Wang
(74) *Attorney, Agent, or Firm* — David B. Kelley; Carlson, Gaskey & Olds, P.C.

(57) ABSTRACT

Battery pack designs are provided for use in electrified vehicles. Exemplary battery packs may include a battery array that includes one or more interconnected array frames. A split thermal fin may be held within the one or more array frames. The proposed designs of the split thermal fin enable a reduction of the amount of thermal interface material required between the thermal fin and a support structure (e.g., a heat exchanger plate) of the battery pack.

15 Claims, 7 Drawing Sheets

(56) References Cited

U.S. PATENT DOCUMENTS

| | | |
|---|---|---|
| 2016/0218401 A1 | 7/2016 | Hermann et al. |
| 2017/0125863 A1 | 5/2017 | March |
| 2018/0114957 A1 | 4/2018 | Kim et al. |
| 2020/0058971 A1 | 2/2020 | Smith |
| 2021/0376407 A1 | 12/2021 | Newnham et al. |

* cited by examiner

BATTERY ARRAY FRAMES WITH SPLIT THERMAL FIN DESIGNS FOR REDUCING THERMAL INTERFACE MATERIAL USAGE

CROSS-REFERENCE TO RELATED APPLICATION

This is a divisional of U.S. patent application Ser. No. 17/010,135, filed on Sep. 2, 2020, and which is incorporated herein by reference.

TECHNICAL FIELD

This disclosure relates generally to electrified vehicle battery packs, and more particularly to battery packs that utilize split thermal fin configurations for reducing the amount of thermal interface material (TIM) required between the thermal fin and adjacent structures.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

The traction battery pack includes a plurality of battery cells that store energy for powering electrical loads. The battery cells can generate heat during charging and discharging operations. This heat should typically be dissipated in order to achieve a desired level of battery performance. Heat exchanger plates, often referred to as "cold plates," may be used for dissipating the heat. A thermal interface material (TIM) may also be used to increase the thermal conductivity between the battery cells and the heat exchanger plate.

SUMMARY

A battery array frame according to an exemplary aspect of the present disclosure includes, among other things, a frame body, a first thermal fin section held within the frame body, and a second thermal fin section held within the frame body and received in abutting contact with the first thermal fin section.

In a further non-limiting embodiment of the foregoing battery array frame, the frame body includes a first frame section and a second frame section connected to the first frame section.

In a further non-limiting embodiment of either of the foregoing battery array frames, the first frame section includes a leg portion received within a groove formed in the second frame section.

In a further non-limiting embodiment of any of the foregoing battery array frames, the first thermal fin section includes an edge portion received within a slot formed in a receiving portion of the second thermal fin section.

In a further non-limiting embodiment of any of the foregoing battery array frames, the slot extends between upward extending walls of the receiving portion, and each of the upward extending walls includes an inner surface and at least one ridge formed on the inner surface.

In a further non-limiting embodiment of any of the foregoing battery array frames, the second thermal fin section includes a first portion embedded within the frame body and a second portion that extends outside of the frame body.

In a further non-limiting embodiment of any of the foregoing battery array frames, the second portion extends beneath a bottom wall of the frame body.

In a further non-limiting embodiment of any of the foregoing battery array frames, the frame body includes a plurality of arch shaped ridges positioned in abutting contact with the second thermal fin section.

In a further non-limiting embodiment of any of the foregoing battery array frames, the second thermal fin section includes a protruding fin that biases a portion of the second thermal fin section in a direction away from the frame body.

In a further non-limiting embodiment of any of the foregoing battery array frames, a spring insert is positioned between the frame body and the second thermal fin section.

A battery pack according to another exemplary aspect of the present disclosure includes, among other things, a heat exchanger plate and a battery array positioned against the heat exchanger plate. The battery array includes an array frame comprising a frame body and a split thermal fin received within the frame body.

In a further non-limiting embodiment of the foregoing battery pack, a second array frame is connected to the array frame. The second array frame includes a second frame body and a second split thermal fin received within the second frame body.

In a further non-limiting embodiment of either of the foregoing battery packs, the frame body includes a first frame section that holds a first fin section of the split thermal fin and a second frame section that holds a second fin section of the split thermal fin.

In a further non-limiting embodiment of any of the foregoing battery packs, the first fin section includes an edge portion received within a slot formed in a receiving portion of the second fin section.

In a further non-limiting embodiment of any of the foregoing battery packs, the second fin section includes a leg portion that protrudes outside of the second frame section and contacts the heat exchanger plate.

In a further non-limiting embodiment of any of the foregoing battery packs, the second frame section includes a plurality of arch shaped ridges positioned in abutting contact with the second fin section.

In a further non-limiting embodiment of any of the foregoing battery packs, the second fin section includes a protruding fin that contacts the second frame section.

In a further non-limiting embodiment of any of the foregoing battery packs, a spring insert is disposed between the second frame section and the second fin section.

In a further non-limiting embodiment of any of the foregoing battery packs, a thermal interface material is disposed between a leg portion of the split thermal fin and the heat exchanger plate.

In a further non-limiting embodiment of any of the foregoing battery packs, the array frame is a plastic structure, and the split thermal fin and the heat exchanger plate are both metallic structures.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs may include a battery array that includes one or more interconnected array frames. A split thermal fin may be held within the one or more array frames. The proposed designs of the split thermal fin enable a reduction of the amount of thermal interface material required between the thermal fin and a support structure (e.g., a heat exchanger plate) of the battery pack. These and other features are discussed in greater detail in the following paragraphs of this detailed description.

Figure 1:
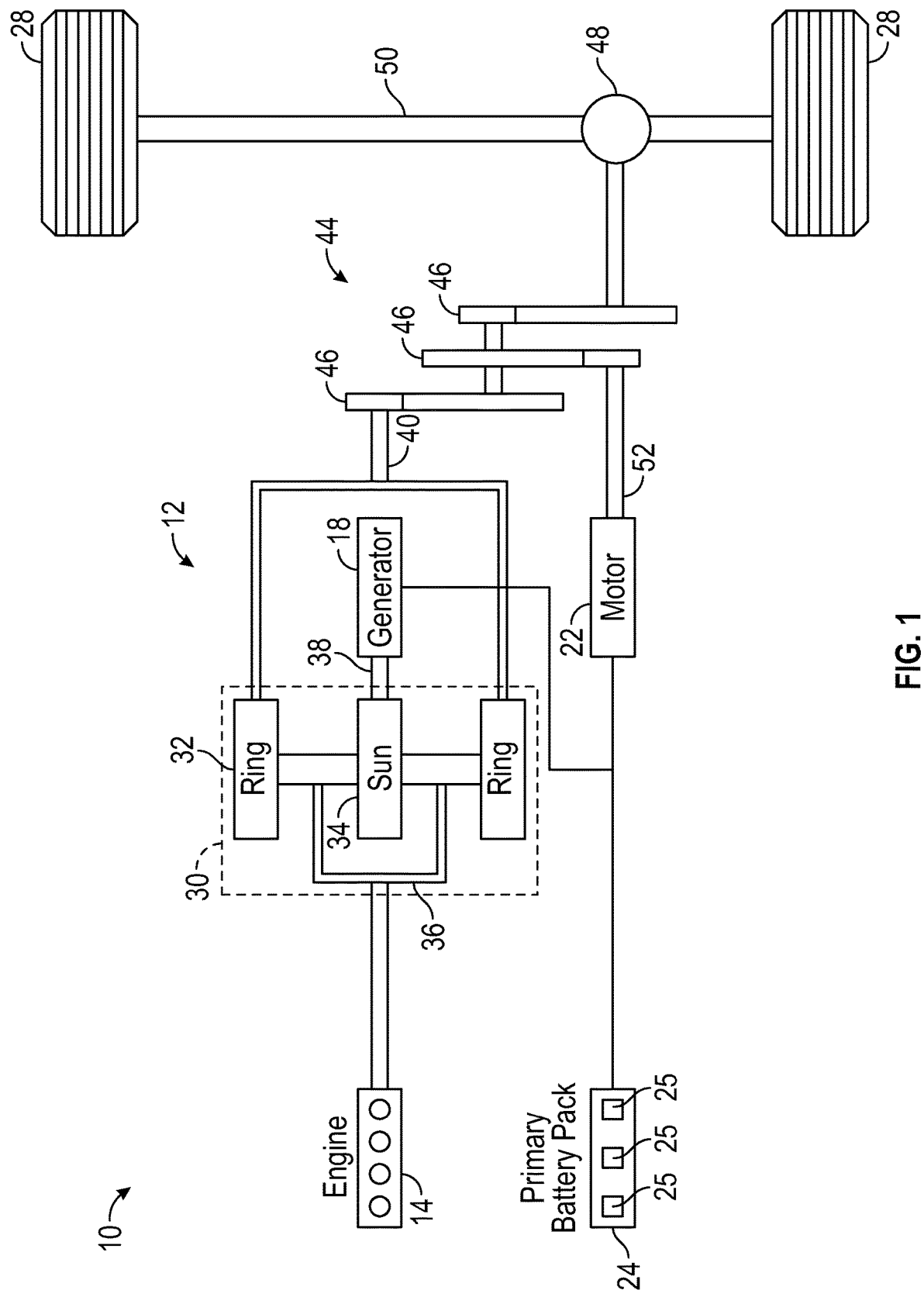
FIG. 1 schematically illustrates an exemplary powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery pack. The battery pack 24 may be a high voltage traction battery pack that includes a plurality of battery arrays 25 (i.e., battery assemblies or groupings of battery cells) capable of outputting electrical power to operate the motor 22 and/or other electrical loads of the electrified vehicle 12 and further capable of receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
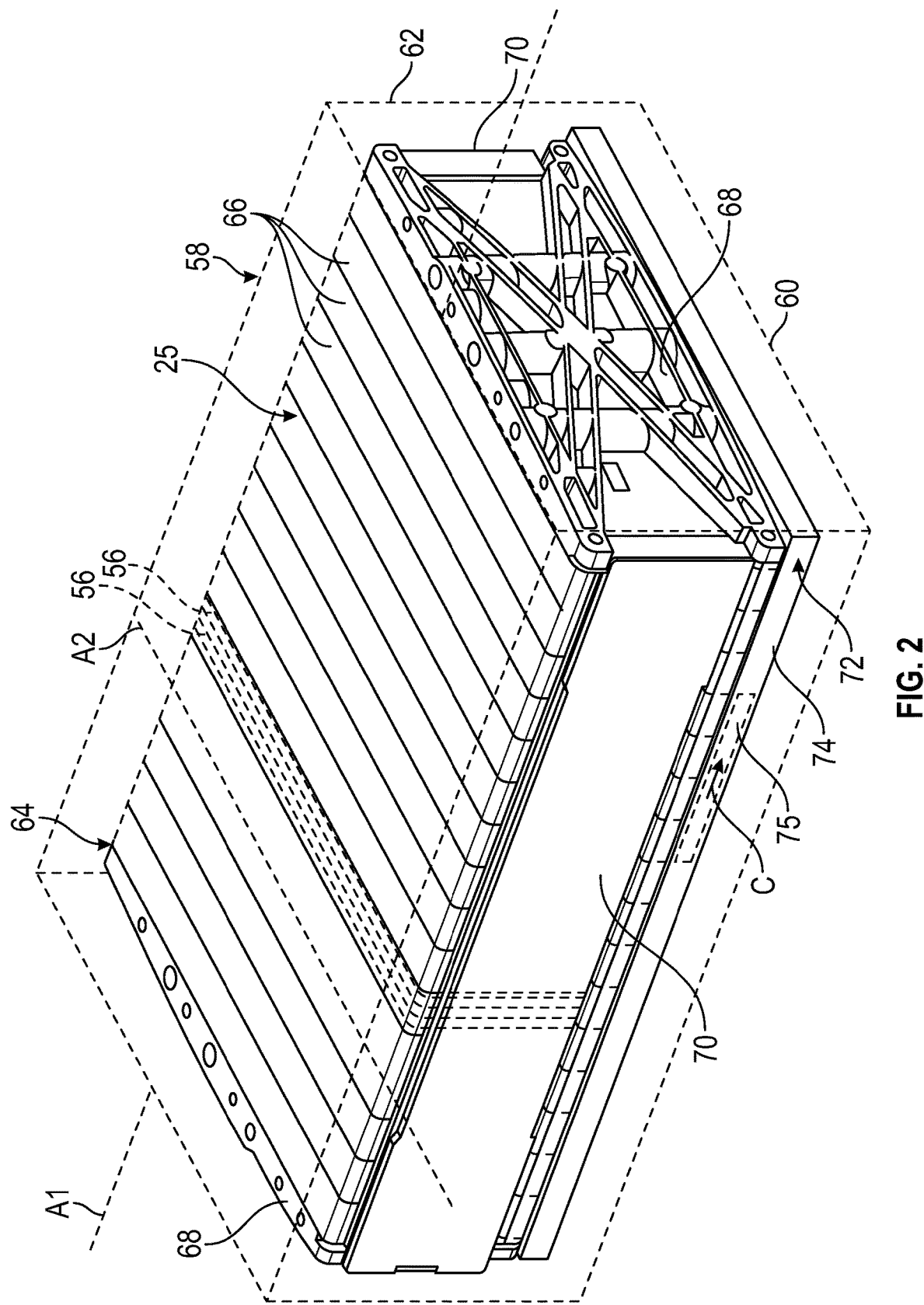
FIG. 2 illustrates a battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1 or any other electrified powertrain. FIG. 2 is a perspective view of the battery pack 24, and some external components (e.g., an enclosure assembly 58) are shown in phantom to better illustrate the internal components of the battery pack 24.

The battery pack 24 houses a plurality of battery cells 56 that store energy for powering various electrical loads of the electrified vehicle 12. Two exemplary battery cells 56 are shown in phantom in FIGS. 2 and 4. However, the battery pack 24 could employ any number of battery cells within the scope of this disclosure, and this disclosure is not limited to the exact configuration shown in FIG. 2.

The battery cells 56 may be arranged in a row to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array 25. Although the battery pack 24 of FIG. 2 is depicted as including a single battery array 25, the battery pack 24 could include a greater number of battery arrays within the scope of this disclosure.

An enclosure assembly 58 houses each battery array 25 of the battery pack 24. In an embodiment, the enclosure assembly 58 is a sealed enclosure that includes a tray 60 and a cover 62 that is secured to the tray 60 to enclose and seal the battery array 25 of the battery pack 24. In another embodiment, the battery array 25 is first positioned within the tray 60 of the enclosure assembly 58, and the cover 62 may then be received over the battery array 25. The enclosure assembly 58 may include any size, shape, and configuration within the scope of this disclosure.

In an embodiment, the battery cells 56 of the battery array 25 are supported, held, and/or retained together by a support structure 64 disposed around an outer perimeter of the cell stack. The support structure 64 may include a plurality of interconnected array frames 66, opposing end plates 68, and opposing side plates 70. The array frames 66 are stacked side-by-side, assembled together, and positioned between the opposing end plates 68, which are disposed at the longitudinal extents of the battery array 25, and between the opposing side plates 70, which connect laterally between the opposing end plates 68. In an embodiment, the battery array 25 extends along a longitudinal axis A1 between the opposing end plates 68, and the array frames 66 each extend along a respective longitudinal axis A2 that is generally transverse to the longitudinal axis A1.

The battery array 25 may be positioned against (e.g., on top of) a heat exchanger plate 72, sometimes referred to as a cold plate, in order to position the battery cells 56 in close proximity to the heat exchanger plate 72. The battery pack 24 could employ one or more heat exchanger plates within the scope of this disclosure.

The heat exchanger plate 72 may be part of a liquid cooling system configured for thermally managing the battery cells 56 of the battery array 25. For example, heat may be generated and released by the battery cells 56 during charging operations, discharging operations, or other operations or conditions. The heat should typically be dissipated from the battery pack 24 to improve capacity, life, and performance of the battery cells 56. The heat exchanger plate 72 may be configured to conduct the heat out of the battery cells 56. For example, the heat exchanger plate 72 may function as a heat sink for removing heat from the heat sources (i.e., the battery cells 56). The heat exchanger plate 72 could alternatively be employed to heat the battery cells 56, such as during extremely cold ambient conditions, for example. Although shown as a separate component from the tray 60, the heat exchanger plate 72 could alternatively be integrated with the tray 60 as a single component.

The heat exchanger plate 72 may include a plate body 74 and a coolant circuit 75 formed inside the plate body 74. The coolant circuit 75 may include one or more passageways that extend inside the plate body 74. In an embodiment, the coolant circuit 75 establishes a meandering coolant path inside the plate body 74.

A coolant C from a coolant source (not shown) may be selectively circulated through the coolant circuit 75 to thermally condition the battery cells 56 of the battery pack 24. The coolant source could be part of a main cooling system of the electrified vehicle 12 or could be a dedicated coolant source of the battery pack 24. Although not shown, the coolant C may pass through a heat exchanger before entering the heat exchanger plate 72.

In an embodiment, the coolant C is a conventional type of coolant mixture, such as water mixed with ethylene glycol. However, other coolants, including gases, are also contemplated within the scope of this disclosure.

In use, heat from the battery cells 56 is conducted into the plate body 74 of the heat exchanger plate 72 and then into the coolant C as the coolant C is communicated through the coolant circuit 75. The heat may therefore be carried away from the battery cells 56 by the coolant C.

In an embodiment, the heat exchanger plate 72 is an extruded part. In another embodiment, the heat exchanger plate 72 is made of a metallic material, such as aluminum. However, other manufacturing techniques and materials are also contemplated within the scope of this disclosure.

Figure 3:
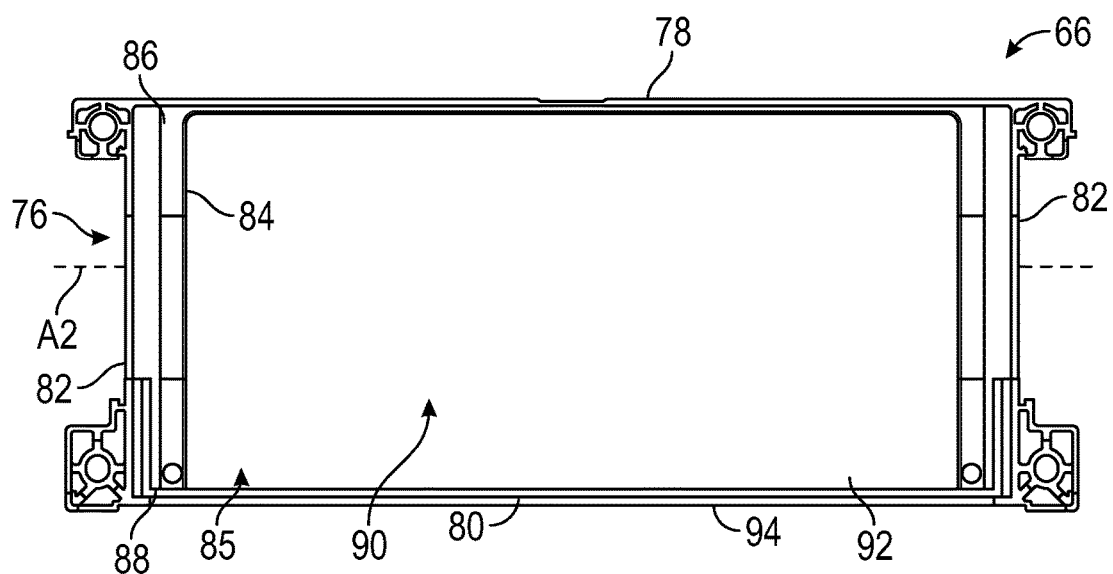
FIG. 3 illustrates an exemplary array frame of the battery pack of FIG. 2.
Figure 4:
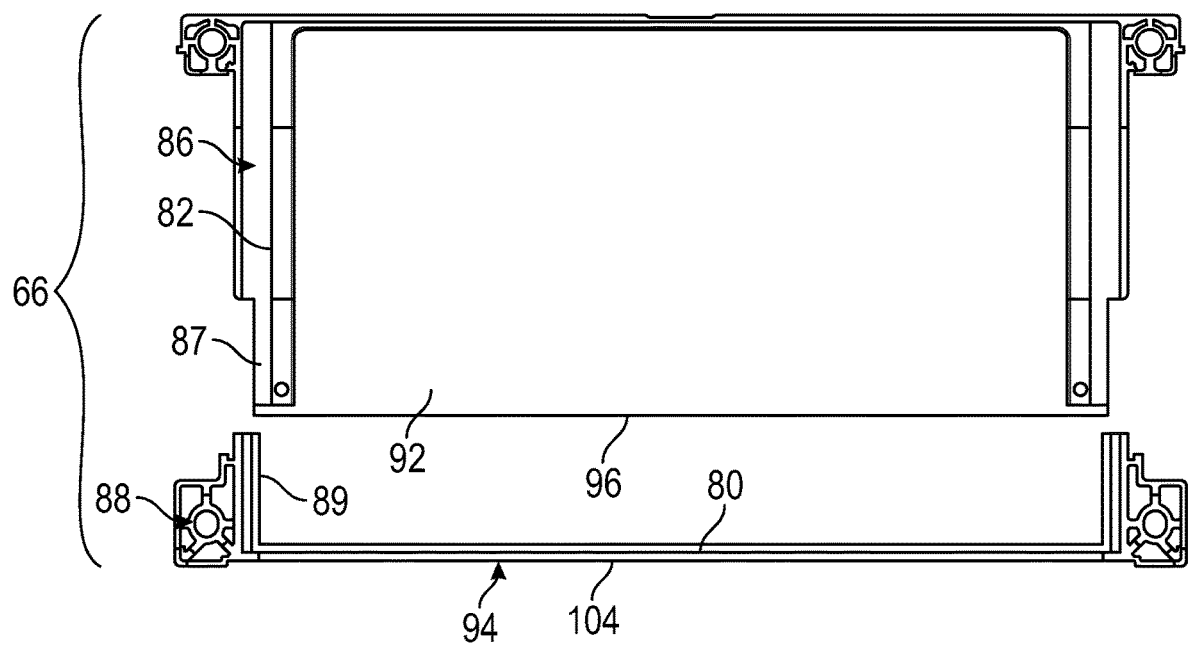
FIG. 4 is an exploded view of the array frame of FIG. 3.

FIGS. 3 and 4, with continued reference to FIG. 2, illustrate an exemplary array frame 66 of the battery array 25. The array frame 66 may include a frame body 76 extending along the longitudinal axis A2. When assembled, the frame body 76 may be rectangular shaped (i.e., four sided) and may establish a top wall 78, a bottom wall 80, and frame arms 82 that connect between the top wall 78 and the bottom wall 80. In an embodiment, the frame arms 82 are disposed near opposing ends (i.e., near the longitudinal extents) of the top wall 78 and the bottom wall 80. The top wall 78, the bottom wall 80, and the frame arms 82 establish a perimeter around an opening 84 formed through the frame body 76. In an embodiment, the top wall 78 and the bottom wall 80 extend horizontally and in parallel with the longitudinal axis A2 of the frame body 76, and the frame arms 82 extend vertically and transverse to the longitudinal axis A2. When mounted within the battery pack 24 (see FIG. 2), the bottom wall 80 may be closer to the tray 60 and thus establishes a portion of a base of the battery array 25, and the top wall 78 may be closer to the cover 62 and thus establishes a portion of an upper surface of the battery array 25.

Each opposing side of the frame body 76 may establish a pocket 85 that is sized and shaped to receive a battery cell 56. Each array frame 66 may house either one or two battery cells 56, with each pocket 85 capable of receiving a single battery cell 56.

The frame body 76 of the array frame 66 may be a plastic structure. In an embodiment, frame body 76 includes a split or two-piece design that includes a first or upper frame section 86 and a second or lower frame section 88. The upper frame section 86 and the lower frame section 88 may be snap-connected together to establish the frame body 76. In an embodiment, a leg portion 87 of each frame arm 82 of the upper frame section 86 is received within a groove 89 formed in each frame arm 82 of the lower frame section 88 to connect the upper frame section 86 to the lower frame section 88. Of course, an opposite configuration is also contemplated within the scope of this disclosure in which leg portions of the lower frame section 88 are accommodated within grooves of the upper frame section 86.

A thermal fin 90 may be held or otherwise disposed within the frame body 76 of the array frame 66 for separating adjacent battery cells 56 from one another. In an embodiment, the thermal fin 90 is a metallic (e.g., aluminum) component that is insert molded within the frame body 76 and is therefore at least partially embedded within the array frame 66. However, the thermal fin 90 can be mounted within the frame body 76 of the array frame 66 in any known manner and could be made from various materials.

Like the frame body 76, the thermal fin 90 may include a split or two-piece design that includes a first or upper fin section 92 and a second or lower fin section 94. The upper fin section 92 may be over molded or otherwise embedded within the upper frame section 86, and the lower fin section 94 may be over molded or otherwise embedded within the lower frame section 88. The upper fin section 92 and the lower fin section 94 may be extruded components, in an exemplary embodiment.

The upper fin section 92 and the lower fin section 94 may be connected together to assemble the thermal fin 90 as the upper frame section 86 is secured to the lower frame section 88. In an embodiment, a lower edge portion 96 of the upper fin section 92 is received within a slot 98 formed in a receiving portion 100 of the lower fin section 94 to connect the upper fin section 92 to the lower fin section 94 (see, e.g., FIGS. 4-5). Of course, an opposite configuration is also contemplated within the scope of this disclosure in which an edge portion of the lower fin section 94 is accommodated within a groove of the upper fin section 92.

The receiving portion 100 of the lower fin section 94 may include a pair of parallel, spaced apart, upward extending walls 95. The slot 98 extends between the walls 95. Each of the walls 95 includes an inner surface 97. One or more ridges 99 may be formed on each inner surface 97. The ridges 99 are configured to ensure proper mating contact between the upper fin section 92 and the lower fin section 94.

Figure 5:
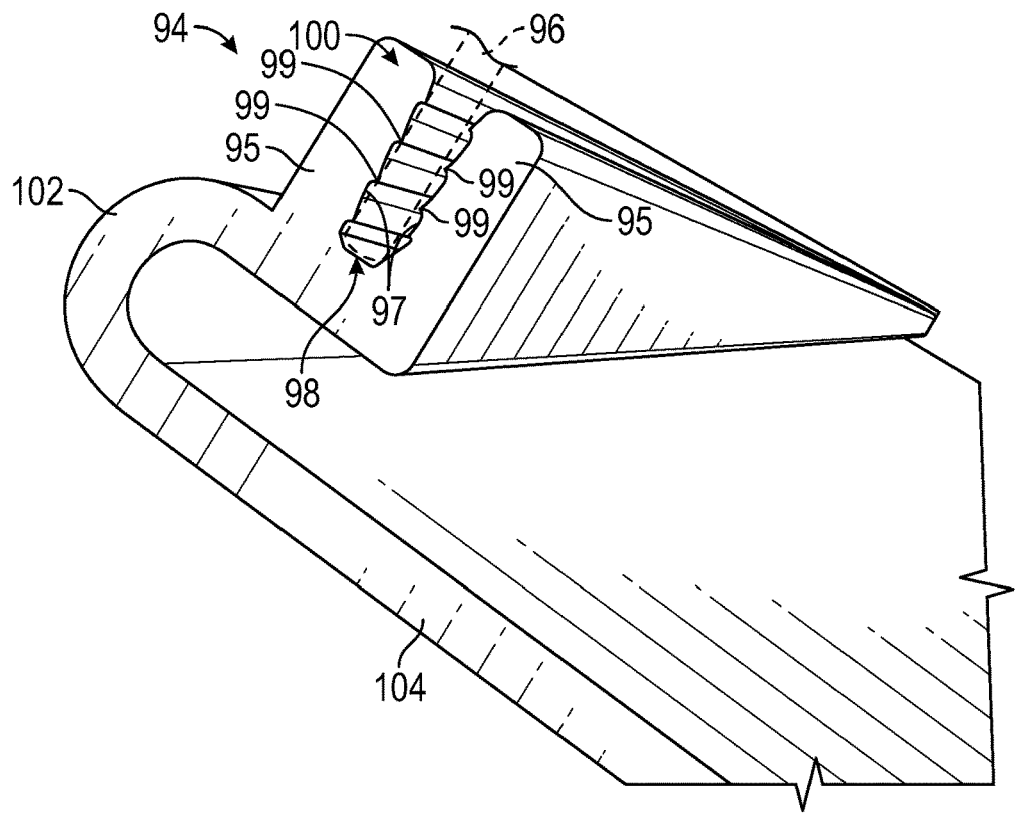
FIG. 5 illustrates select portions of a lower fin section of a thermal fin of the array frame of FIGS. 3 and 4.
Figure 6:
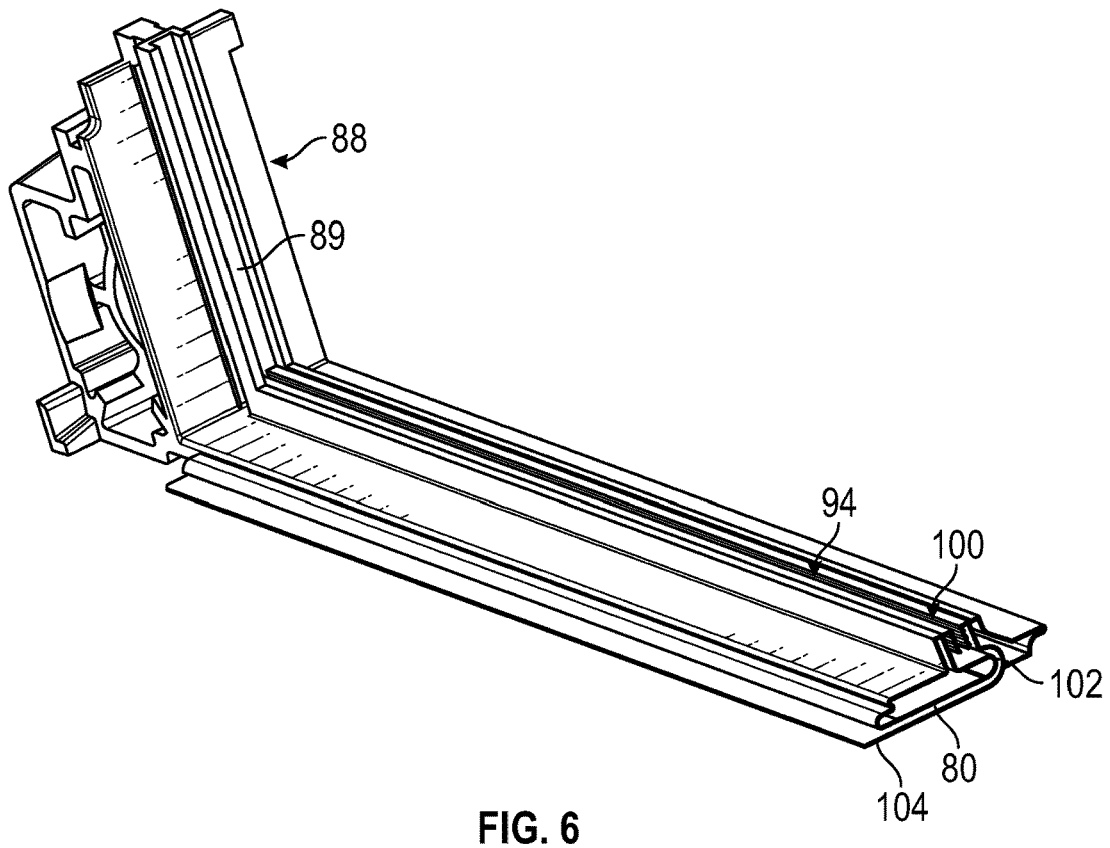
FIG. 6 is a cross-sectional perspective view of a lower frame section of the array frame of FIGS. 3 and 4.

Referring now primarily to FIGS. 5 and 6, the receiving portion 100 of the lower fin section 94 may be molded into the lower frame section 88 of the frame body 76. A curved portion 102 of the lower fin section 94, which may also be embedded within the lower frame section 88, may be integrally connected at one end to the receiving portion 100 and at an opposite end to a leg portion 104 of the lower fin section 94. The leg portion 104 of the lower fin section 94 may be oriented transversely relative to the receiving portion 100 such that it extends underneath the bottom wall 80 of the lower frame section 88. The leg portion 104 may extend to a position that is laterally outward of the laterally outer surfaces of the lower frame section 88.

Figure 7:
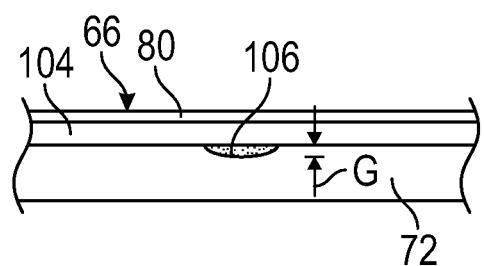
FIG. 7 is a cross-sectional assembly view of a portion of a battery pack equipped with the array frame of FIGS. 3 and 4.

Referring now primarily to FIG. 7, the array frame 66 (or a plurality of interconnected array frames 66) may be positioned over top of the heat exchanger plate 72 when assembling the battery pack 24. The split design of the thermal fin 90 helps ensure that the leg portion 104 of the lower fin section 94 rests naturally via gravity on the heat exchanger plate 72, thereby reducing or in some instances even eliminating the need for applying a thermal interface material between the leg portion 104 of the lower fin section 94 and the heat exchanger plate 72. Thermal interface materials, such as epoxy resins, silicone based materials, or thermal greases, are designed to increase the thermal conductivity between the thermal fin 90 and the heat exchanger plate 72, however, these materials are relatively expensive and thus desirable to reduce the amount of thermal interface materials that must be utilized within the battery pack 24.

The split design of the thermal fin 90 may further provide for an adjustable float between the leg portion 104 of the lower fin section 94 and the heat exchanger plate 72. The adjustable float may help reduce the amount or relative size of gaps G that can develop between the leg portion 104 and the heat exchanger plate 72, such as a result of sagging that can occur along the length of the heat exchanger plate 72. In areas where gaps G develop, a thermal interface material 106 may be applied between the leg portion 104 and the heat exchanger plate 72 in order to increase the thermal conductivity between these neighboring components. However, the amount of the thermal interface material 106 that is required to fill each gap G is significantly reduced compared to prior battery array designs.

Figure 8:
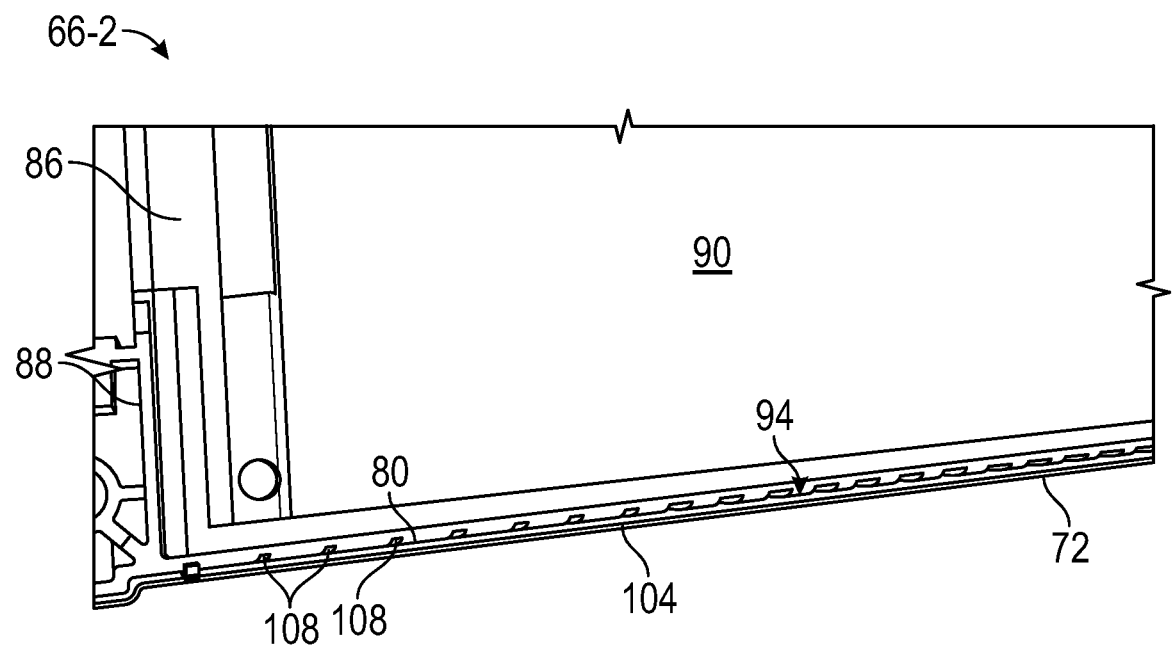
FIG. 8 illustrates another exemplary array frame of a battery pack.

FIG. 8 illustrates another exemplary array frame 66-2. The array frame 66-2 is similar to the array frame 66 discussed above. However, in this embodiment, the lower frame section 88 of the array frame 66-2 may include a plurality of ridges 108. The ridges 108 may be spaced apart from one another and may protrude from a surface of the lower frame section 88. In an embodiment, the ridges 108 protrude outwardly from the bottom wall 80 of the lower frame section 88 (e.g., in a direction away from upper frame section 86). However, the ridges could be provided at any surface of the lower frame section 88 that is intended to interface with the thermal fin 90. The total number of ridges 108 provided on the lower frame section 88 is design dependent and is therefore not intended to limit this disclosure.

The ridges 108 may embody a variety of sizes and shapes. In an embodiment, the ridges 108 are arch shaped. The ridges 108 may be cambered for accommodating heat exchanger plate sagging. The ridges 108 are configured to push, deflect, or bias the leg portion 104 of the lower fin section 94 into positive contact with the heat exchanger plate 72, thereby reducing or in some cases eliminating the need to apply a thermal interface material between the leg portion 104 of the lower fin section 94 and the heat exchanger plate 72.

The ridges 108 may be an integral component of the lower frame section 88. In an embodiment, the ridges 108 are molded-in features of the lower frame section 88.

Figure 9:
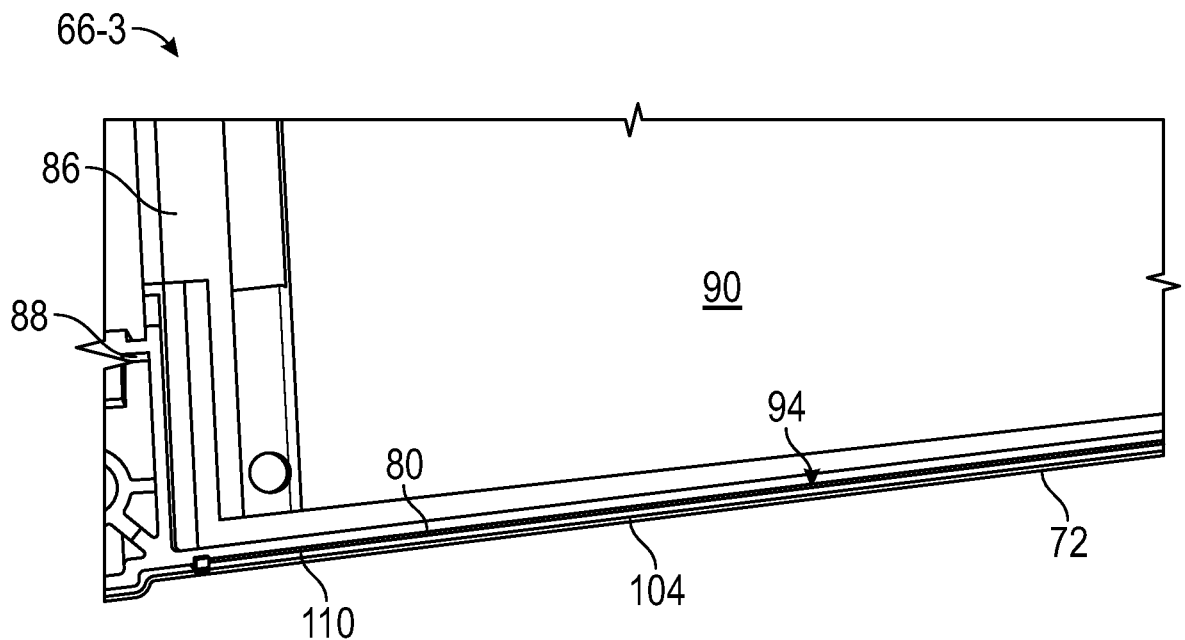
FIG. 9 illustrates another exemplary array frame of a battery pack.

FIG. 9 illustrates another exemplary array frame 66-3. The array frame 66-3 is similar to the array frame 66 discussed above. However, in this embodiment, the lower fin section 94 of the array frame 66-3 may include one or more protruding fins 110. The protruding fin 110 may protrude from an upper surface 112 of the leg portion 104 of the lower fin section 94 (see, e.g., FIG. 10). The upper surface 112 is located on an opposite side of the leg portion 104 from the surface that is positioned relative to the heat exchanger plate

Figure 10:
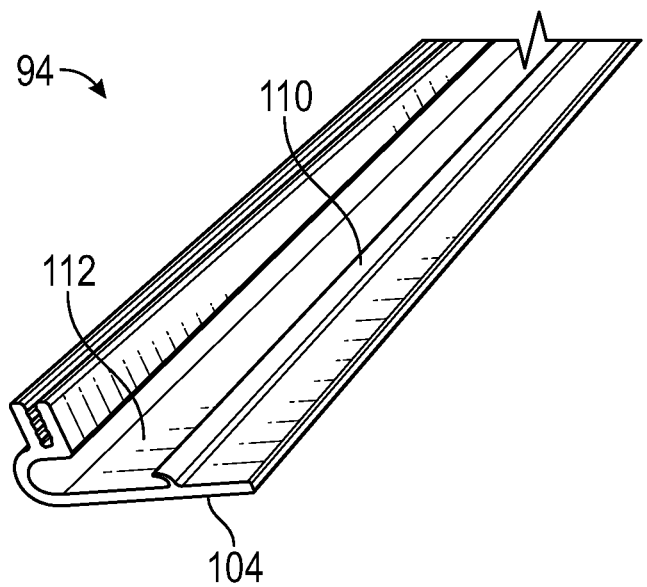
FIG. 10 illustrates a lower fin section of a thermal fin of the array frame of FIG. 9.

72. Although a single protruding fin 110 is illustrated in FIGS. 9-10, the lower fin section 94 could be provided with one or more protruding fins within the scope of this disclosure.

The protruding fin 110 is configured to contact the bottom wall 80 of the lower frame section 88, thereby pushing, deflecting, or otherwise biasing the leg portion 104 of the lower fin section 94 into positive contact with the heat exchanger plate 72. The positive contact achieved between the leg portion 104 and heat exchanger plate 72 can reduce or even eliminate the need to apply a thermal interface material between the leg portion 104 of the lower fin section 94 and the heat exchanger plate 72.

The protruding fin 110 may be an integral component of the lower fin section 94. In an embodiment, the protruding fin 110 is formed integrally into the upper surface 112 in an extrusion process.

Figure 11:
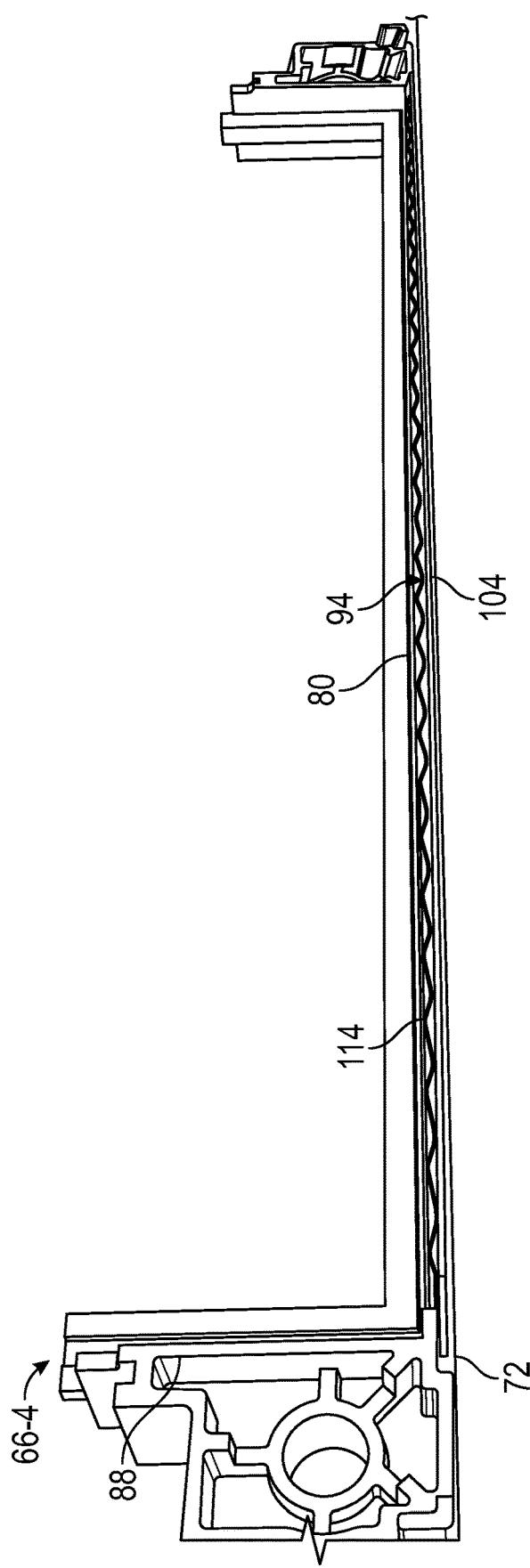
FIG. 11 illustrates select portions of yet another exemplary array frame of a battery pack.

FIG. 11 illustrates select portions of yet another array frame 66-4. The array frame 66-4 is similar to the array frame 66 discussed above. However, in this embodiment, the array frame 66-4 incorporates a spring insert 114. The spring insert 114 may be positioned between the bottom wall 80 of the lower frame section 88 and the leg portion 104 of the lower fin section 94. The spring insert 114 is configured to push, deflect, or otherwise bias the leg portion 104 of the lower fin section 94 into positive contact with the heat exchanger plate 72, thereby reducing or even eliminating the need to apply a thermal interface material between the leg portion 104 of the lower fin section 94 and the heat exchanger plate 72.

Figure 12:
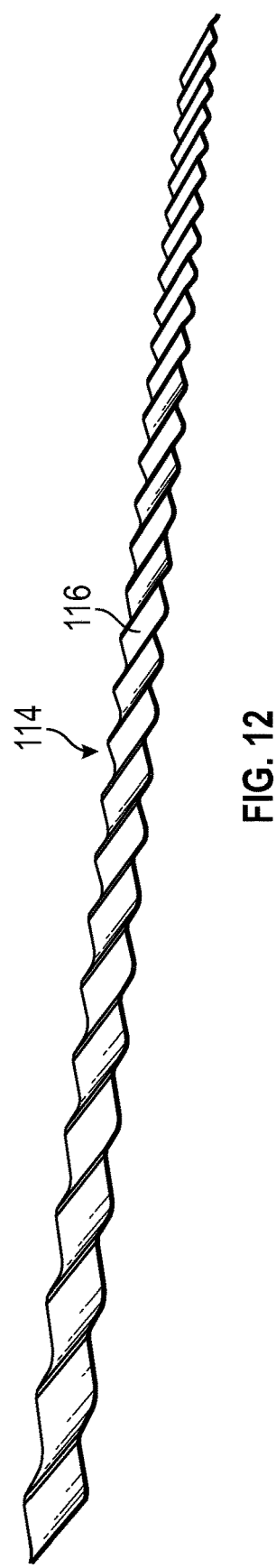
FIG. 12 illustrates a spring insert of the array frame of FIG. 11.

In an embodiment, the spring insert 114 is a separate component from both the thermal fin 90 and the frame body of the array frame 66-4. The spring insert 114 may include an undulating shaped body 116 (see FIG. 12). The specific configuration of the undulating shaped body 116 can be optimized based on the profile of the heat exchanger plate 72, among other design criteria.

The battery pack designs of this disclosure incorporate a unique and adaptable split thermal fin design that enables the reduction of usage or complete elimination of thermal interface materials between the thermal fin and the heat exchanger plate. The proposed battery array frame designs reduce assembly complexity and costs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery array frame, comprising:
   a frame body including a first frame section and a second frame section connected to the first frame section;
   a first thermal fin section held within the first frame section;
   a second thermal fin section held within the second frame section and received in abutting contact with the first thermal fin section; and
   a protruding fin positioned in contact with a bottom wall of the second frame section in order to bias the second thermal fin section in a direction away from the frame body,
   wherein the second thermal fin section includes a first portion embedded within the second frame section of the frame body and a second portion that extends outside of the second frame section, and the second portion is a flat, non-tubular structure.

2. The battery array frame as recited in claim 1, wherein the frame body is a plastic structure, and the first thermal fin section and the second thermal fin section are metallic structures.

3. The battery array frame as recited in claim 1, wherein the first frame section includes a leg portion received within a groove formed in the second frame section.

4. The battery array frame as recited in claim 1, wherein the first thermal fin section is embedded within each of a first frame arm, a second frame arm, and a top wall of the first frame section and includes a lower edge portion configured to engage the second thermal fin section.

5. The battery array frame as recited in claim 4, wherein the lower edge portion is received within a slot formed in a receiving portion of the second thermal fin section.

6. The battery array frame as recited in claim 5, wherein the slot extends between upward extending walls of the receiving portion, and further wherein each of the upward extending walls includes an inner surface and at least one ridge formed on the inner surface.

7. The battery array frame as recited in claim 1, wherein the second portion extends beneath the bottom wall of the second frame section.

8. The battery array frame as recited in claim 1, wherein the protruding fin protrudes from an upper surface of the second portion of the second thermal fin section.

9. The battery array frame as recited in claim 8, wherein a tip of the protruding fin is configured to contact the bottom wall of the second frame section to deflect the second thermal fin section in a direction away from the second frame section.

10. The battery array frame as recited in claim 9, wherein the tip is a curved tip that curves upwardly away from the upper surface of the second portion of the second thermal fin section.

11. A traction battery pack, comprising:
    a heat exchanger plate;
    a battery array positioned against the heat exchanger plate,
    wherein the battery array includes a first array frame comprising a first frame section that holds a first fin section of a split thermal fin, and a second frame section that holds a second fin section of the split thermal fin; and
    a biasing device configured to force the second fin section into contact with the heat exchanger plate,
    wherein the second fin section includes a leg portion that protrudes outside of the second frame section, and further wherein the leg portion abuts the heat exchanger plate,
    wherein the biasing device includes a protruding fin that biases the leg portion into contact with the heat exchanger plate, wherein the protruding fin curves outwardly away from an upper surface of the leg portion and contacts a bottom wall of the second frame section to deflect the leg portion such that a lower surface of the leg portion is moved into positive contact with the heat exchanger plate.

12. The traction battery pack as recited in claim 11, comprising a second array frame that is connected to the first array frame, wherein the second array frame includes a second split thermal fin.

13. The traction battery pack as recited in claim 11, wherein the first fin section includes an edge portion received within a slot formed in a receiving portion of the second fin section.

14. The traction battery pack as recited in claim 11, comprising a thermal interface material disposed between the leg portion of the split thermal fin and the heat exchanger plate.

15. The traction battery pack as recited in claim 11, wherein the first array frame is a plastic structure, and the split thermal fin and the heat exchanger plate are both metallic structures.

* * * * *